(12) United States Patent
Lee et al.

(10) Patent No.: US 7,299,039 B2
(45) Date of Patent: Nov. 20, 2007

(54) METHOD AND SYSTEM FOR PROVIDING DATA SERVICE IN INTERWORKING WIRELESS PUBLIC AND PRIVATE NETWORKS

(75) Inventors: Sung-Hoon Lee, Seoul (KR); Tai-Yoon Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 67 days.

(21) Appl. No.: 11/049,873

(22) Filed: Feb. 4, 2005

(65) Prior Publication Data
US 2005/0176413 A1 Aug. 11, 2005

(30) Foreign Application Priority Data
Feb. 6, 2004 (KR) ...................... 10-2004-0008081

(51) Int. Cl.
*H04M 1/00* (2006.01)
*H04Q 7/20* (2006.01)

(52) U.S. Cl. ................. 455/426.1; 455/554.1; 455/435.3; 455/353; 455/354; 455/555; 455/445; 370/355; 370/356; 370/363; 370/381; 370/382; 370/383

(58) Field of Classification Search ................ 455/445, 455/433, 426.1, 554.1, 552.1, 555, 435.1; 370/354, 353, 355, 356, 363, 374, 381
See application file for complete search history.

(56) References Cited

U.S. PATENT DOCUMENTS 5,303,287 A * 4/1994 Laborde .................. 455/426.1

(Continued)

FOREIGN PATENT DOCUMENTS

JP 6-245255 9/1994

(Continued)

OTHER PUBLICATIONS

Australian Office Action of the Australian Patent Application No. 2004-201054, mailed on Mar. 17, 2006.

(Continued)

*Primary Examiner*—Rafael Perez-Gutierrez
*Assistant Examiner*—Kwasi Karikari
(74) *Attorney, Agent, or Firm*—Robert E. Bushnell, Esq.

(57) ABSTRACT

A method and system for providing a data service in interworking wireless public and private networks, allows for data service data being transmitted through the private network when a data service is to be transmitted through the private network within the network where the wireless public network and the wired/wireless private network are interworked. A method of providing a data service in interworking wireless public and private networks, includes transmitting, by a user, a data service request signal; determining, by the private network, based on identifier information through which of the private and public networks to transmit the data service; transmitting a private network data service call to a private content server when it is determined based on the identifier information that it is the private network data service call; and transmitting a public network data service call to a public network content server when it is determined based on the identifier information that it is the public network data service call. Consequently, there is an advantage that a packet data service can be forwarded through any one selected from the public network and the private network. Further, there is another advantage that a data service is available through the private network by modifying the system without changing each user terminal, and thus an additional cost is hardly caused.

12 Claims, 7 Drawing Sheets

U.S. PATENT DOCUMENTS

| | | | |
|---|---|---|---|
| 5,590,172 A * | 12/1996 | Lodwig et al. | 455/436 |
| 5,729,544 A * | 3/1998 | Lev et al. | 370/352 |
| 5,818,824 A * | 10/1998 | Lu et al. | 370/328 |
| 5,890,064 A * | 3/1999 | Widergen et al. | 455/445 |
| 5,924,030 A * | 7/1999 | Rautiola et al. | 455/426.1 |
| 5,995,610 A | 11/1999 | Smidt et al. | |
| 6,073,018 A * | 6/2000 | Sallberg | 455/435.2 |
| 6,223,055 B1 * | 4/2001 | Cyr | 455/555 |
| 6,416,414 B1 | 7/2002 | Stadelmann | |
| 6,480,595 B1 | 11/2002 | Hamano | |
| 6,704,569 B2 * | 3/2004 | Larson | 455/426.1 |
| 6,807,431 B2 * | 10/2004 | Sayers et al. | 455/555 |
| 6,961,559 B1 * | 11/2005 | Chow et al. | 455/555 |
| 7,006,847 B2 * | 2/2006 | Sato et al. | 455/561 |
| 2002/0037716 A1 | 3/2002 | McKenna et al. | |
| 2002/0107985 A1 | 8/2002 | Hwang et al. | |
| 2003/0063616 A1 | 4/2003 | Lee | |
| 2003/0086418 A1 * | 5/2003 | McIntosh et al. | 370/356 |
| 2003/0195967 A1 | 10/2003 | Selgas et al. | |
| 2003/0220107 A1 | 11/2003 | Lioy et al. | |
| 2004/0030752 A1 | 2/2004 | Selgas et al. | |
| 2004/0072593 A1 * | 4/2004 | Robbins et al. | 455/560 |
| 2005/0105497 A1 * | 5/2005 | Belkin et al. | 370/338 |

FOREIGN PATENT DOCUMENTS

| | | |
|---|---|---|
| JP | 10-336728 | 12/1998 |
| JP | 11-252612 | 8/1999 |
| JP | 2003-179646 | 6/2003 |
| JP | 2003-198726 | 7/2003 |
| JP | 2003-234786 | 8/2003 |
| KR | 2002-0007100 | 1/2002 |

OTHER PUBLICATIONS

Chinese Office Action corresponding to Chinese Patent Application No. 200510007890.X, issued on Feb. 16, 2007.

Australian Office Action corresponding to Australian Patent Application No. 2004244645, issued on Mar. 2, 2007.

* cited by examiner

| MS_ID | | PACKET DATA ROUTE | AUTHENTICATION | BILLING |
|---|---|---|---|---|
| MS MIN | MS ESN | | | |
| XXXX | YYYY | private(PRIVATE NETWORK SETUP) | 0 | 1 |
| | | public(ff) | f | f |
| | | public(Default) | | |
| | | public(Default) | | |
| | | public(Default) | | |

METHOD AND SYSTEM FOR PROVIDING DATA SERVICE IN INTERWORKING WIRELESS PUBLIC AND PRIVATE NETWORKS

CLAIM OF PRIORITY

This application makes reference to, incorporates the same herein, and claims all benefits accruing under 35 U.S.C. §119 from an application for METHOD OF PROCESSING DATA SERVICE OF NETWORK INCLUDING WIRELESS PUBLIC NETWORK AND PRIVATE NETWORK AND SYSTEM THEREOF earlier filed in the Korean Intellectual Property Office on 6 Feb. 2004 and there duly assigned Serial No. 2004-8081.

BACKGROUND OF THE INVENTION

1. Field of the Invention

The present invention relates to a service provided through interworking wireless public and private networks and, more particularly, to a method and system for providing a data service in interworking wireless public and private networks, in which the data service (local data service) is provided through a private network within the interworking networks of the wireless public network and the wired/wireless private network.

2. Description of the Related Art

As a solution for providing voice calls and data services under an in-building office environment free of charge, a system grafting CDMA-RF (Code-Division Multiple Access-Radio Frequency) technology on a local wired/wireless private branch exchange appears for the first time.

The present invention will be described herein with reference to the in-building wireless environment, wherein the in-building wireless environment refers to not only an office environment such as an office building but also a communication environment within a certain zone (e.g., a campus, an army camp, etc.).

In this manner, with such a system where the wireless public network and wired/wireless private networks are interworked, it enables a call at any different place within the building, supports a hand-off function with the public wireless network upon deviation from a local zone, and provides a variety of additional services, for example, of forwarding an emergency message by use of a short message service, retrieving necessary in-building information at the exterior if an intra-net is established, and so on.

However, this system does not currently support a local packet data service function (through the private network).

This is because a terminal cannot discriminate whether the current data received within the private network is for the public network or for the private network after transmitting a local data service request signal.

Further, authenticating and billing for a corresponding data service are controlled and processed by separate equipment (e.g., Authentication Accounting Authorization; AAA) within a DCN (data core network) of the public network. The authenticating and billing are collectively processed depending on an option set in a database of a data service system, so that a selection of the authenticating and billing is not offered to a user.

A general form of a data service will be described as follows, showing a route providing a data service through a general wireless public network.

First, when a terminal on the side of transmitting a call makes an attempt at connection to its corresponding server in order to get the data service, this connection signal is received by a base transceiver station (BTS), is matched at a base station controller (BSC) or a control station, and then is forwarded to a packet data serving node (PDSN). The PDSN transmits the currently received data call to a content server so that a session is established between the call transmitting side terminal and the content server.

In this manner, when such a system is connected with a wired/wireless private network, it must be determined within the private network through which of the public and private networks the currently received data is routed. However, there is a problem in that no discrimination information serving as a basis of the determination is present.

In other words, when a local wireless terminal makes an attempt at connection to a data service server of the local private network within the network where the wireless public network and the wired/wireless private network are interworked, the data service is unconditionally provided through the public network because there is no discrimination information indicating that the data service is provided using which of the public and private networks.

Consequently, there is a problem that the local data service (through the private network) is unavailable through the existing network where the wireless public network and the wired/wireless private network are interworked.

SUMMARY OF THE INVENTION

The present invention, therefore, is devised to solve the aforementioned and other problems. It is an objective of the present invention to provide a method and system for providing a data service in interworking wireless public and wired/wireless private networks so that a user of the private network selectively uses a local (private network) data service and a wide (public network) data service using his or her wireless terminal.

It is another objective of the present invention to allow a user to select an authenticating and billing way for a corresponding data call.

It is yet another object to accommodate a packet data service being forwarded through the private network by upgrading software in the system without changing hardware and software in each user terminal, and thus separate cost is not caused.

It is another object of the present invention to provide a method and system for providing a data service in interworking wireless public and wired/wireless private networks that is easy to implement, cost effective and yet highly efficient.

According to one aspect of the present invention for achieving these and other objectives, there is provided a method of providing a data service in wireless public and private networks, including: a first step of setting up, by an arbitrary terminal, an identifier indicating through which of the private and public networks to transmit the data service; and a second step of retrieving the terminal identifier received from the arbitrary terminal to request the data service through a corresponding network based on the retrieved information.

According to another aspect of the present invention for achieving these and other objectives, there is provided a method of requesting a data service in wireless public and private networks, including: a first step of setting up, by a user, through which of the networks (namely, the private network or the public network) to receive the data service; a second step of storing information set up by the user in a private network database; and a third step of, if an arbitrary user requests the data service, retrieving an identifier of a corresponding user terminal from the private network database, and providing the data service through a corresponding one of the private network and the public network depending on a status set up in the database.

The method further includes a fourth step of releasing a function for a data service setup through the private network.

The first step is performed by the user inputting and setting up digits using button keys of the wireless terminal.

The digit is composed of a combination of a private network access code, a function access code, and a characteristic code (private network data service setup function code).

The second step in the method is performed by referring to a field for a private network route that is set up for each entry of a private network data service setup table in a database within a private network control station, wherein a data service request signal received through a base station is transmitted to the private network control station along with the identifier of the corresponding user terminal.

The fourth step in the method is performed by the user inputting and setting a specific number (a private network access code plus a function access code plus a characteristic code (private network data service setup and release function code)) using a button key of the wireless terminal.

According to yet another aspect of the present invention for achieving these and other objectives, there is provided a system for providing a data service in interworking wireless public and private networks, including: at least one base station for receiving a data service request signal received from an arbitrary wireless terminal and transmitting data to be transmitted to the arbitrary wireless terminal; a public network taking charge of data control upon transmitting and receiving through the public network the data service request signal transmitted and received through the at least one base station; a private network having a route determining unit for determining, based on an identifier of the call transmitting side terminal included in the data service request signal received at the base station, through which of the private and public networks to send data for the data service, and transmitting the data through a corresponding network; and a private network dedicated private content server for directly providing the data service through the private network rather than through the public network, when the private network determines that the currently received data service request signal is for a private network data service.

The private network includes: a database having a table structure composed of an identifier field of a call transmitting side terminal and a field indicating a data service route; a route determining unit for determining the data service route with respect to the identifier by referring to a database that stores the identifier of the call transmitting side terminal transmitting the data service request signal received through the base station, and transmitting the data to a corresponding one of the private network and the public network; and a private network control module for transmitting data for a private network data service to a private content server when the data received through a data routing software module is the private network data service and, when there is an input regarding a setup to use which one of the private network and the public network from the call transmitting side terminal, writing the input to the database.

The database further includes: an authentication field indicating whether to perform an authentication process when the data service is provided for the user; and a billing field indicating whether to perform billing computation for a data call when the data service is provided for the user.

The data service route field of the database includes an initial setup (default), the initial setup being set as a public network when the data service route is not voluntarily set by the user.

The private network control module includes: a private network control module for managing a plurality of base stations and taking charge of a wireless channel setup and a frequency hopping process; and a private PDSN (packet data serving node) module taking charge of a switching function on a data call for a data service.

According to still another aspect of the present invention for achieving these and other objectives, there is provided a method of providing a data service in interworking wireless public and private networks, including: a first step of transmitting, by a user, a data service request signal; a second step of determining, by the private network, based on identifier information through which of the private and public networks to transmit the data service; a third step of transmitting a private network data service call to a private content server when it is determined based on the identifier information that it is the private network data service call; and a fourth step of transmitting a public network data service call to a public network content server when it is determined based on the identifier information that it is the public network data service call.

The present invention can also be realized as computer-executable instructions in computer-readable media.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
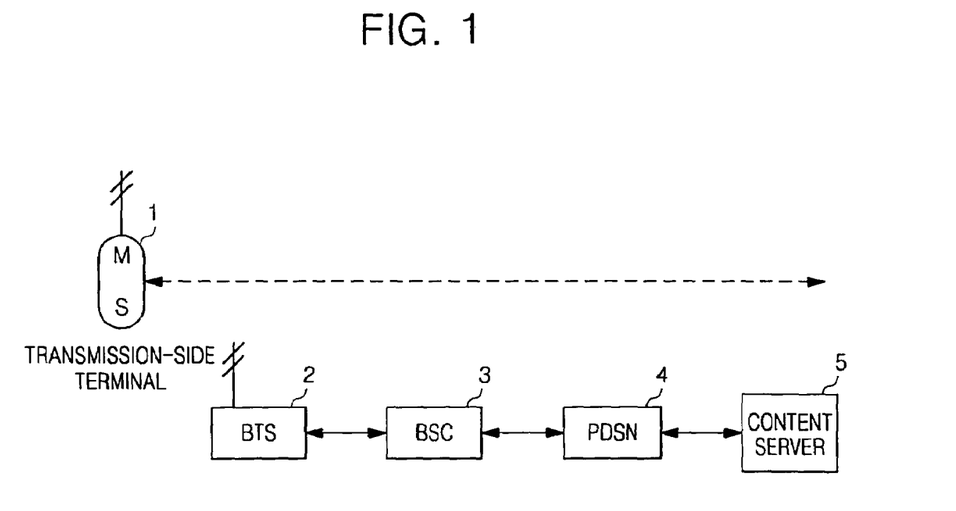
FIG. 1 is a block diagram schematically showing a route for providing a general data service through a wireless public network.

Turning to the drawings, FIG. 1 is a schematic diagram showing a route providing a data service through a general wireless public network.

First, when a terminal 1 on the side of transmitting a call makes an attempt at connection to its corresponding server in order to get the data service, this connection signal is received by a base transceiver station (BTS) 2, is matched at a base station controller (BSC) or a control station 3, and then is forwarded to a packet data serving node (PDSN) 4. The PDSN 4 transmits the currently received data call to a content server 5 so that a session is established between the call transmitting side terminal 1 and the content server 5.

In this manner, when such a system is connected with a wired/wireless private network, it must be determined within the private network through which of the public and private networks the currently received data is routed. However, there is a problem in that no discrimination information serving as a basis of the determination is present.

In other words, when a local wireless terminal makes an attempt at connection to a data service server of the local private network within the network where the wireless public network and the wired/wireless private network are interworked, the data service is unconditionally provided through the public network because there is no discrimination information indicating that the data service is provided using which of the public and private networks.

Consequently, there is a problem that the local data service (through the private network) is unavailable through the existing network where the wireless public network and the wired/wireless private network are interworked.

Hereinafter, exemplary embodiments of the present invention will be described in detail with reference to the accompanying drawings so that those skilled in the art to which the present invention belongs can easily carry out the present invention.

Figure 2:
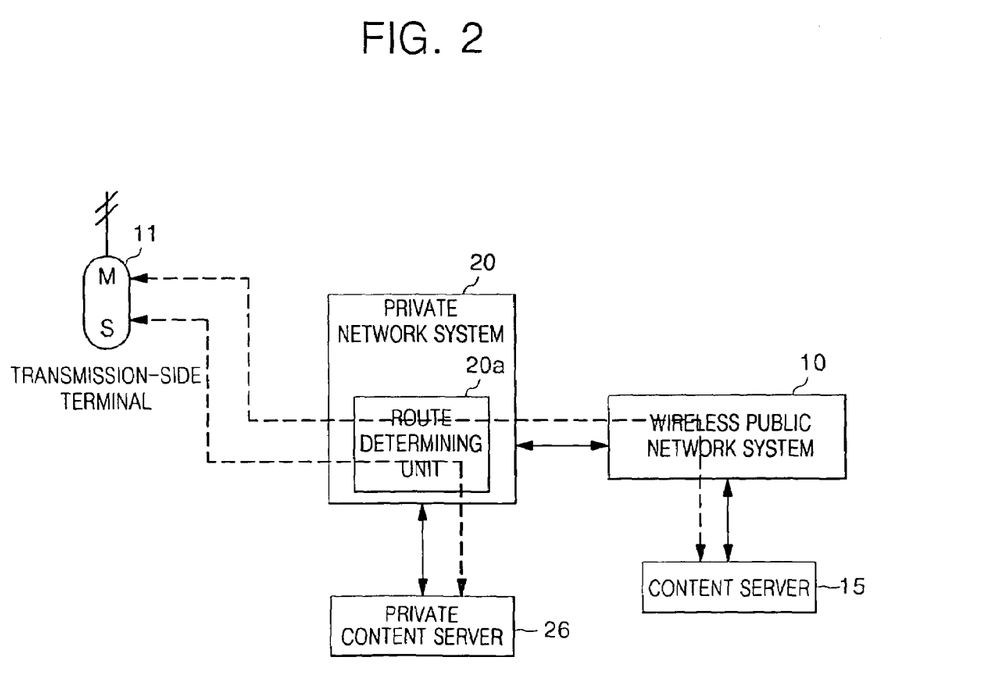
FIG. 2 is a block diagram schematically showing a routing for providing a data service in interworking wireless public and private networks according to the present invention.

FIG. 2 is a block diagram schematically showing a route for providing a data service in interworking wireless public and private networks according to the present invention.

A wired/wireless private network in the present invention means either a wireless private network or a private network connected by wire and wireless.

The public network system 10 further includes a content server 15 for providing a data service.

The private network system 20 further includes a private content server 26 for providing the data service, and a route determining unit 20a for determining through which network to transmit the data service.

The route determining unit 20a can determine through which network to transmit this data, based on a route identifier included in the data request signal received from the call transmitting side terminal 11.

Alternatively, the route determining unit 20a receives a setup message from the call transmitting side terminal 11 in advance, which indicates that the call transmitting side terminal will transmit data through the private network, and stores this setup information in the private network system 20 so that a data request signal from the call transmitting side terminal 11 that will be generated later is transmitted through either the private network or the public network selected based on the information that has been set up by the user.

A process will be described, in which the call transmitting side terminal actually transmits a data service request signal and receives a data service from a corresponding network in the state where the network has been configured as described above.

Since the present invention is directed to a packet data service processed at a call transmitting side terminal, parts unrelated to the configuration of the present invention will be no longer described.

First, if the call transmitting side terminal 11 transmits a data service request signal, a private network system 20 within a coverage area will receive the signal.

The route determining unit 20a in the private network system 20 determines through which network this data is transmitted on the basis of an identifier included in the received data service request signal.

If it is determined by the identifier that the data is transmitted through the private network, this data is transmitted to the private content server 26, so that its corresponding data service can be provided.

If it is determined by the identifier that the data is transmitted through the public network, this data is transmitted to the public network content server 15, so that its corresponding data service can be provided.

Hereinafter, a system in which a private network is connected and operated to a part of the public network will be described by way of example.

Figure 3:
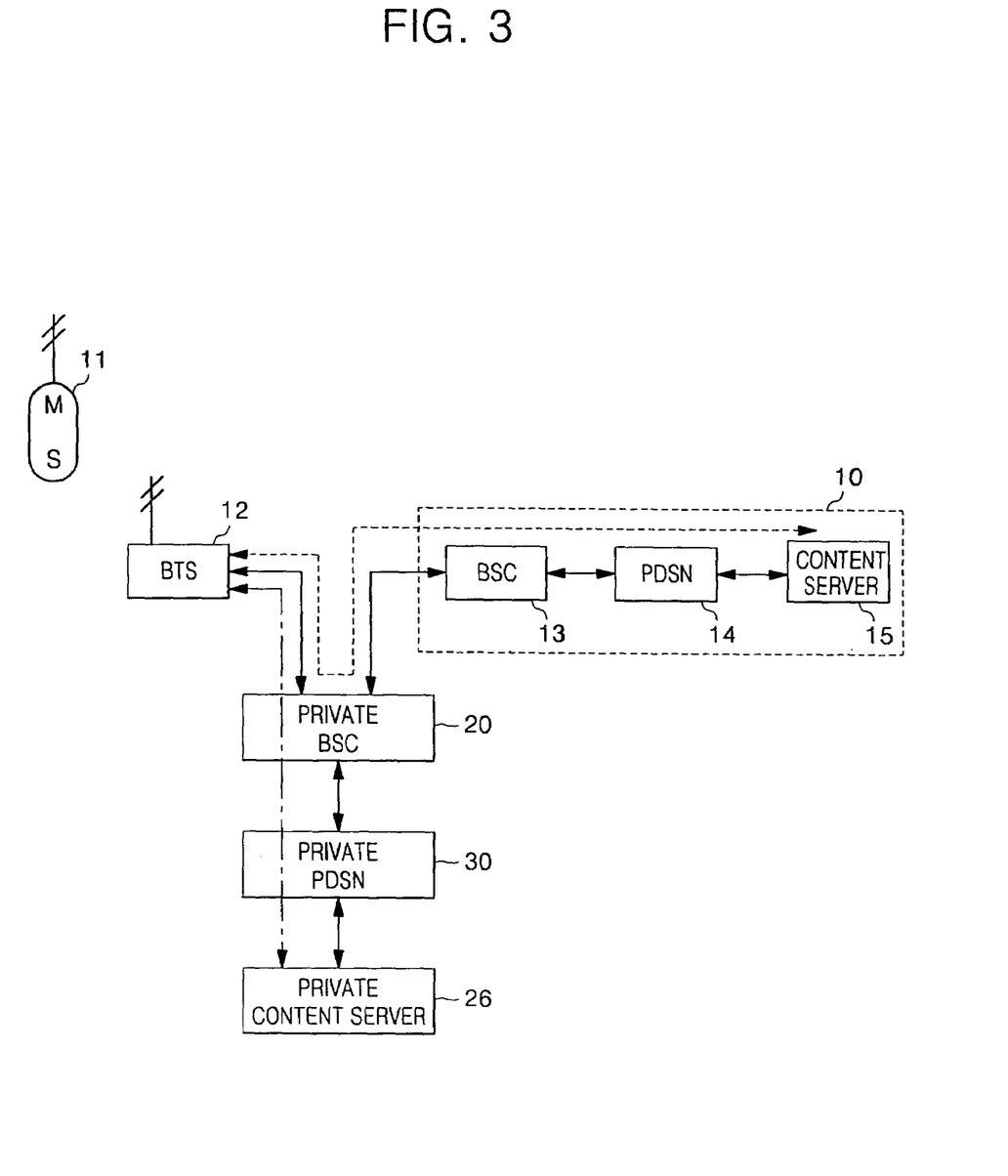
FIG. 3 is a block diagram schematically showing a data-forwarding route in a system in which a private network is connected to a BSC stage of a public network.

FIG. 3 is a block diagram schematically showing a data-forwarding route in a system where a private network is connected to a public network BSC stage.

Referring to FIG. 3, the configuration of interworking wireless public and wired/wireless private networks is generally composed of a wireless public network system 10 and at least one of private network systems 20, 30 and 26.

The configuration of the present invention, for example, in a network where a private BSC is connected to a wireless public network BSC stage will be discussed. The network is composed of a BTS 12, a private BSC 20, a private PDSN 30, a private content server 26, and the public network system 10.

The public network system 10 includes a BSC 13, a packet data serving node (PDSN) 14, and a content server 15. The BSC 13 performs a wireless link control function and a handoff function, and the PDSN 14 performs packet data switching.

The private network system 20 includes a private base station controller (BSC) or a control station 20, a private PDSN 30, and a private content server 26.

The BTS 12 establishes, as its own cell area, a cell coverage where the public and wireless private networks are simultaneously supported.

A shared cell area is disclosed in detail in Korean Patent No. 10-0365790.

Figure 4:
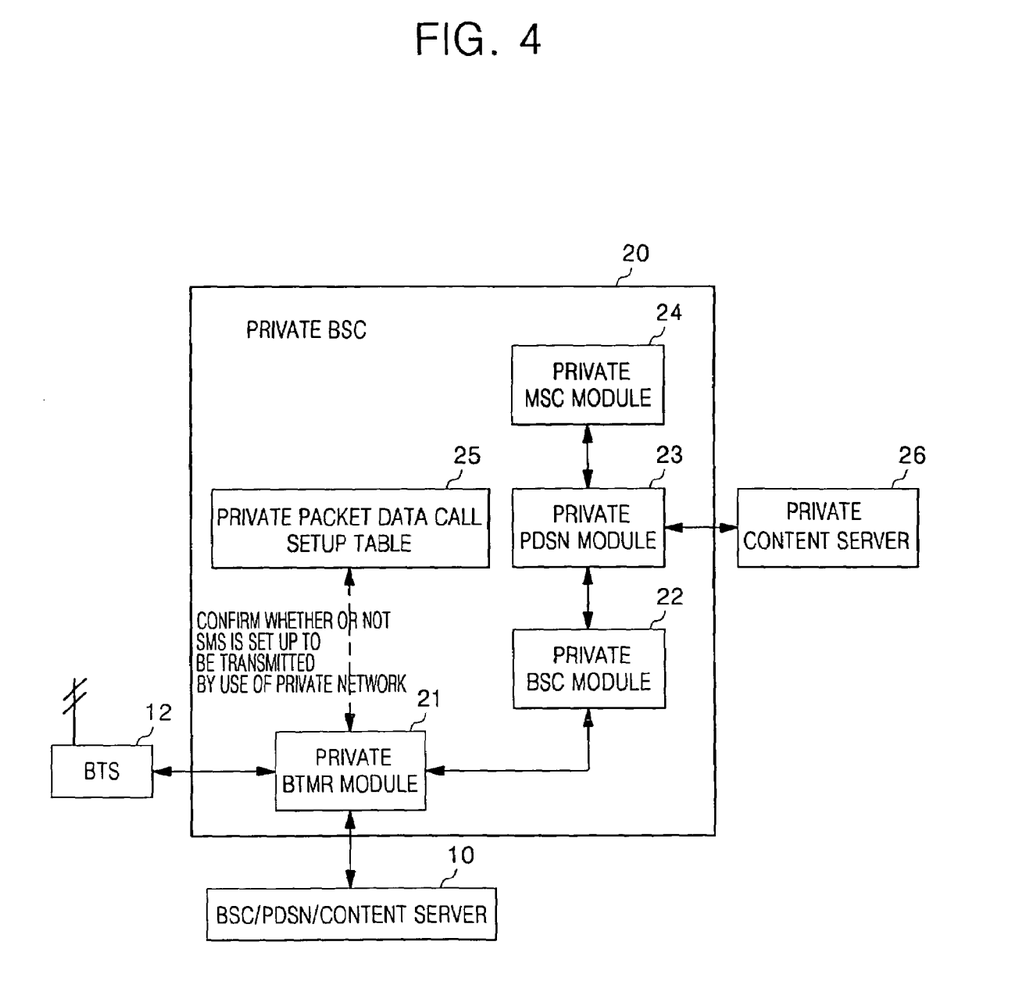
FIG. 4 is a detailed block diagram showing a control station of the private network shown in FIG. 3.

The private BSC 20, as shown in FIG. 4, includes a private BTMR module 21, a private BSC module 22, a private PDSN module 23, a private MSC (Mobile Switching Center) module 24, and a private packet data call setup table 25.

The private BTMR (BTS Message Router) module 21, the private BSC module 22, the private PDSN module 23, and the private MSC module 24 are embodied by software blocks and are classified on a function basis.

The private BTMR module 21 performs a function of retrieving information from the private packet data call setup table 25 in order to determine whether the data received from the BTS 12 is intended for a data call using the private network, and of forwarding (routing) a packet data call through the corresponding network depending on the retrieved information.

The private BSC module 22 may perform functions corresponding to that of the BSC in the public network, namely, the wireless link control and handoff functions.

The private PDSN module 23 may perform a function of switching a packet data call to the corresponding server.

The private MSC module 24 may perform a function of modifying information in the private packet data call setup table 15.

The present invention does not perform only fixed functions between the private BTMR module 21, and private BSC module 22, the private PDSN module 23, and the private MSC module 24. The function may be modified in the most desirable form any time depending on a selection of the user, if necessary.

If an arbitrary terminal (MS: Mobile Station) 11 makes an attempt at connection to the data service, the BTS 12 in the corresponding region receives this data service request signal and matches the signal to the private BSC 20. The private BSC 20 determines through which network (private network or public network) the data is forwarded. If the data is for the private network, the private BSC 20 transmits the data to the private content server 26. However, if the data is for the public network, the private BSC 20 transmits the data to the public network system 10.

The private BSC 20 includes the private BTMR module 21 for determining a data service route with respect to the ID (identification) of the call transmitting side terminal by referring to the database storing the ID of the call transmitting side terminal for the data call received through the BTS 12 and transmitting the data through the corresponding network (private network/public network); the private BSC module 22 for managing a number of base stations and taking charge of wireless channel setup and frequency hopping processing; the private PDSN module 23 for taking charge of a data call switching function; a private MSC module 24 for modifying information in the private packet data call setup table 25 upon modifying information for the terminal; and the private packet data call setup table 25 composed of a private packet data call route information field corresponding to the ID of the call transmitting side terminal.

Figure 5:
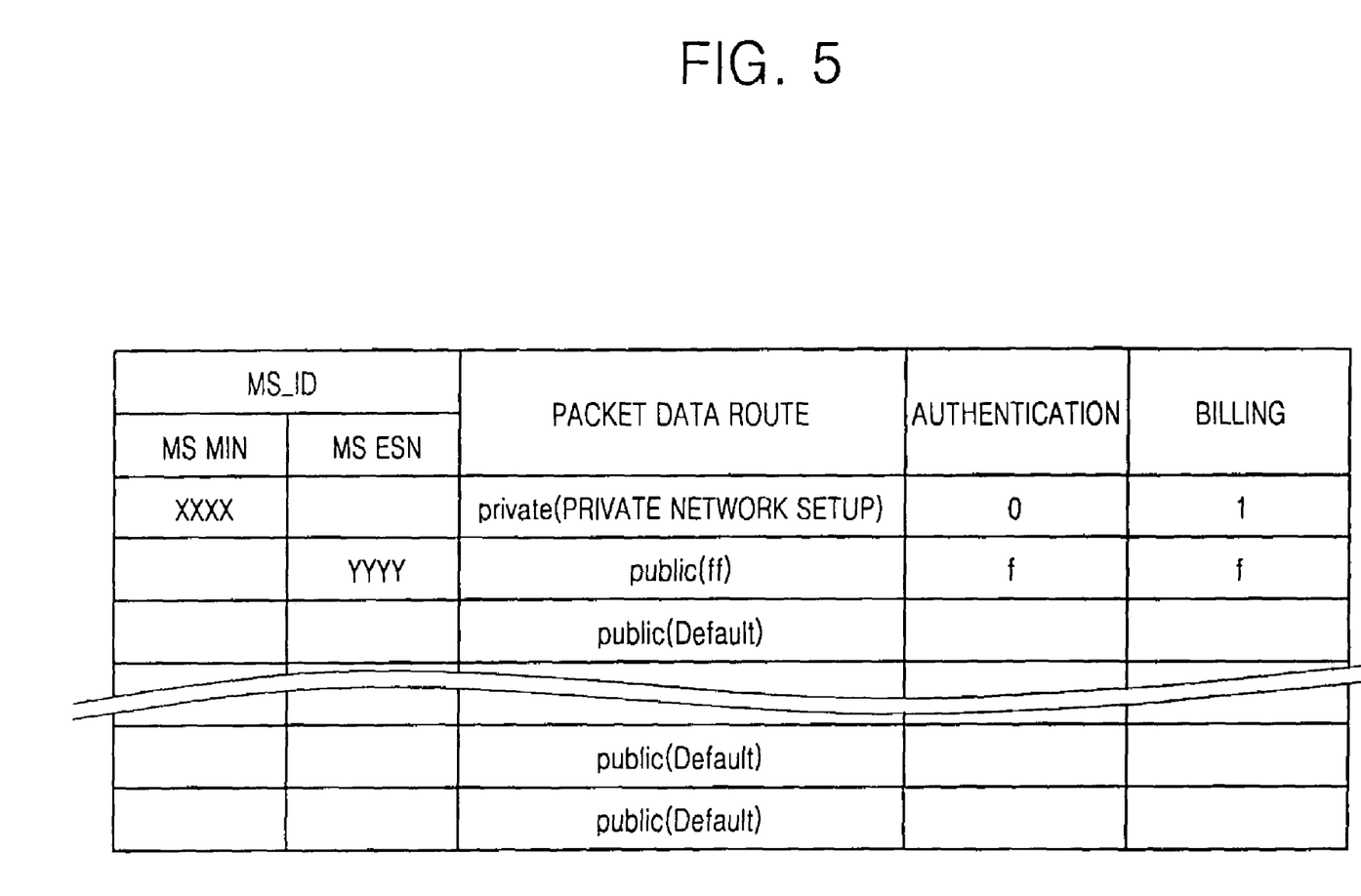
FIG. 5 shows a table for a database having data indicating whether a data service call is forwarded through a private network or not.

FIG. 5 shows a table for a database having data indicating whether to forward a data service call through a private network or not.

Referring to FIG. 5, the private packet data call setup table 25 further includes authenticating and billing fields to allow a user to select methods for authenticating and billing a corresponding data call, in addition to the call transmitting side terminal ID (identification) field and the packet data call route field.

Although the MIN (Mobile Identification Number) and the ESN (Electronic Serial Number) for the call transmitting side terminal ID will be described by way of example in the present invention, the call transmitting side terminal ID field includes international mobile subscriber identity (IMSI), temporary mobile subscriber identity (TMSI), and the like in addition to the MIN and the ESN.

Here, the MIN is a terminal telephone number and is represented in the form of 10-decimal digits. The ESN is a discriminator assigned to the terminal and is assigned 8 bits.

A way of representing the terminal ID is varied according to the type of the terminal. It is not a matter to recognize the terminal ID based on any one of MIN, ESN IMSI, and TMSI.

The private packet data call setup table 25 may belong to the private MSC module 24. Alternatively, the private packet data call setup table 25 may be included in any one of the private PDSN module 23, the private BTMR module 21, and the private BSC module 22. Further, the private packet data call setup table 25 is configured by a separate database.

If an initial setup (default) of the packet data route field is set for the public network, a setup must be made in advance as to using the private network when the packet data is intended for the private network.

On the other hand, if an initial setup (default) of the packet data route field is set for the private network, a setup must be made in advance as to using the public network when the packet data is intended for the public network.

Under this configuration, to provide a packet data service to the user through the private network, a process of establishing a private network data service route must be first performed.

Figure 6:
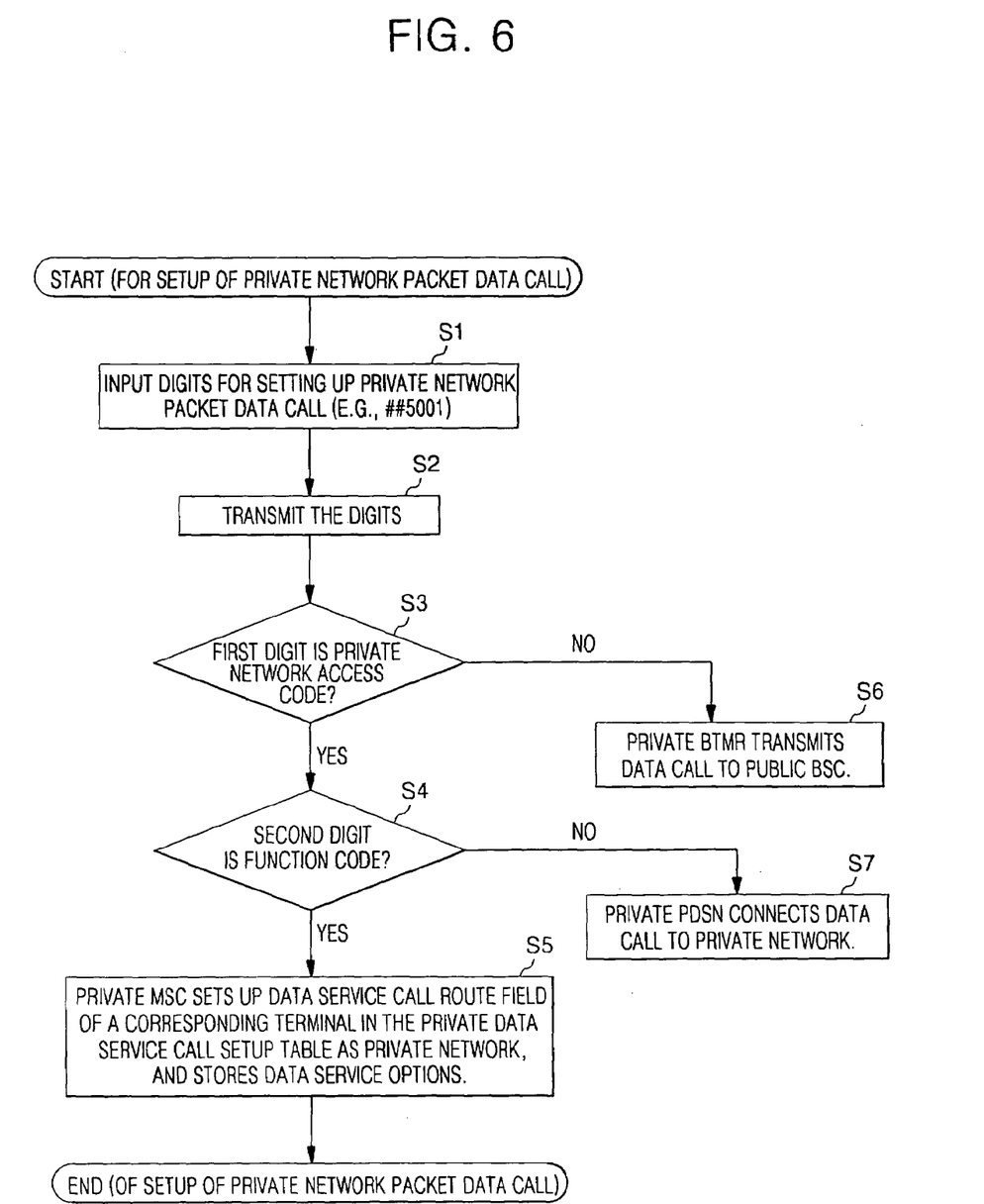
FIG. 6 is a flow diagram illustrating a process in which a user sets up a private network data service according to an embodiment of the present invention.

FIG. 6 is a flow diagram illustrating a process in which a user sets up a private network data route according to an embodiment of the present invention.

A setup process of using the private network will be described with reference to FIG. 6 under the assumption that a characteristic code for setting up a private network data service route is 50.

Although the private network access code is defined as "#" and the function access code is also defined as "#" in the present invention, other values maybe used when they have been defined s for the codes. That is, "*" or values of any other number keys may be used when they have been defined for the codes.

Further, it should be noted that although, for the characteristic code, a code value for a data service through a private network is 50, a code value for releasing the data service setup through the private network is 5f, a code value when an authentication process is performed on a corresponding call is 1, a code value when the authentication process for a corresponding call is performed is 0, a code value when billing computation for a corresponding call is made is 1, and a code value when the billing is not computed is 0, other numerical values may be defined and used for the code values.

The code values for the private network access code, the function access code, and the characteristic code are stored in a database in the private network control station to enable a function corresponding to the corresponding code to be performed depending on a dial digit value transmitted from an arbitrary call transmitting side terminal.

In the following discussion, the first # of dial digits set by the user is a private network access code stored in the database in the private network control station.

First, a user inputs digits "##5001" using button keys on the terminal and transmits the digits by pressing a call button (S1, S2).

The meaning of the "##5001" is shown in the following table 1.

TABLE 1

| # | Private network access code |
|---|---|
| # | Function access code |
| 50 | Characteristic code |
| 0 | Not authenticated |
| 1 | Billing calculation |

The call transmitting side message for setting up a function is transmitted to the private BTMR module 21, where it is determined based on the first digit whether the message indicates a private network service (S3).

If the first digit is one of general numbers, it means that the digit is not a private network access code but a public network access code. Accordingly, the private BTMR module 21 transmits a data call to a public network BSC (S6).

Although the private BTMR module 21 performing the data transmission function has been described by way of example in the present invention, the setup by the private BSC module 22, the private PDSN module 23, and the private MSC module 24 is possible.

Meanwhile, if it is determined in step S3 that the first digit is "#", it means that the first digit is the private network access code, and in turn it is determined whether the second digit is a function code (S4).

If it is determined in step S4 that the second digit is not "#" but one of the general numbers, it is a case where there is no separate function setup while connecting to the private network, and thus the private PDSN module 23 connects the data call to the private network (S7).

Although the private PDSN module 23 connecting the data call to the private network has been described by way of example in the present invention, the data call may be switched through the private MSC module 24 to the private network.

If it is determined in step S4 that the second digit is "#", it is the case where the user desires to setup a separate function. Accordingly, in order to establish a private packet data service route according to the digits "5001" subsequent to the second digit, the private PDSN module 23 or the private MSC module 24 sets a data service call route field of a corresponding terminal in the private data service call setup table 25 as a private network, writes an authentication field to be "0" and writes the billing field to be "1", which are data service options (S5).

Although the private MSC module 23 setting up data service route in the private packet data call setup table 25 has been described by way of example in the present invention, the private BTMR module 21, the private BSC module 22, and the private PDSN module 23 may set up it.

A process of transmitting and receiving packet data through a private network will be described with reference to FIG. 7.

Figure 7:
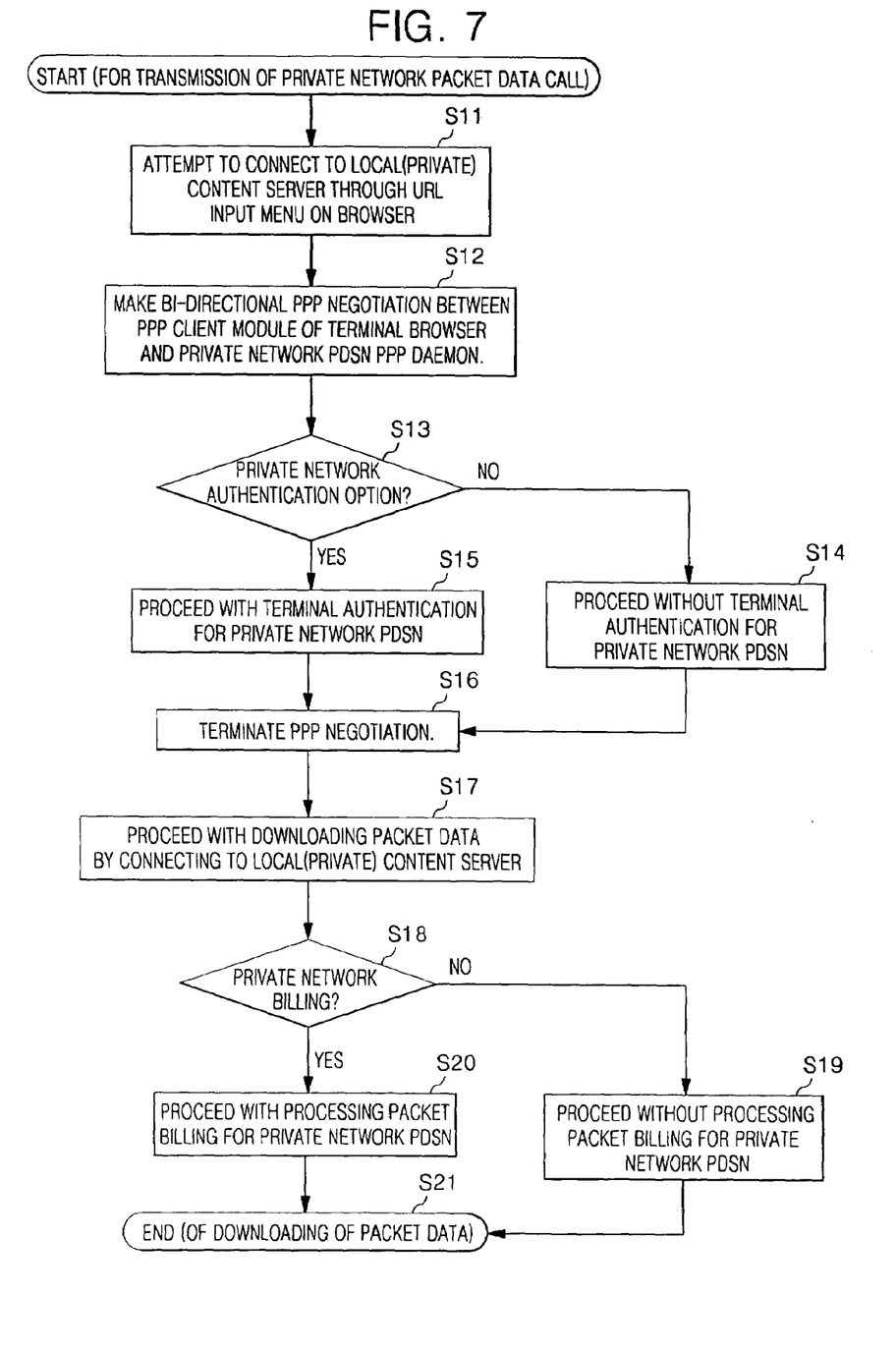
FIG. 7 is a flow diagram illustrating a process in which a data service is provided for a user through a private network according to an embodiment of the present invention.

FIG. 7 is a flow diagram illustrating a process in which a data service is provided for a user through a private network according to an embodiment of the present invention.

If a terminal in a cell area shared by the public and private networks transmits a signal to attempt to connect to the local content server through a URL (Uniform Resource Locator) input menu on its browser (S11), the private BTMR module 21 in the private BSC invokes data transmission and reception route setup information of a corresponding terminal from the private packet data call setup table 25.

The private BTMR module 21 determines by referring to the invoked information whether a private network packet data call route field corresponding to a corresponding ID of the call transmitting side terminal is set as the private network.

If the private network packet data route field corresponding to the corresponding call transmitting side terminal ID is set as the private network, the private BTMR module 21 executes a private PDSN PPP (Point-to-Point Protocol) daemon to make a bi-directional PPP negotiation with a PPP client module of the terminal (S12).

When the PPP negotiation is completed, a value of the authentication field corresponding to the ID (identification) of the corresponding call transmitting side terminal is compared in the private packet data call setup table 25 (S13). If the value of the authentication field is 1, the terminal authentication process is performed (S15) and then PPP negotiation is terminated (S16).

If it is determined in step S13 that the value of the authentication field is 0, the PPP negotiation process is directly terminated (S16) without taking the terminal authentication process (S14).

If the PPP negotiation process is terminated, a session is established between the terminal and the private content server. Accordingly, the terminal is allowed to connect to the local content server, and download packet data desired by the user among contents (S17).

After the download is performed, a value of the billing field corresponding to the ID of the corresponding call transmitting side terminal ID is compared in the private packet data call setup table 25 (S18). If the value of the billing field is 1, billing computation is performed on the corresponding data call (S15), and then packet data downloading is terminated (S21).

If it is determined in step S18 that the value of the billing field is 0, packet data downloading is directly terminated (S21) without performing billing computation on the corresponding data call (S19).

If an arbitrary terminal sets up the private network packet data call route as described above, this terminal is allowed to take the data service through the private network until the setup is released.

Thus, what is needed is a method of releasing a private network packet data call setup so that the user desires to receive the data service through the public network.

Figure 8:
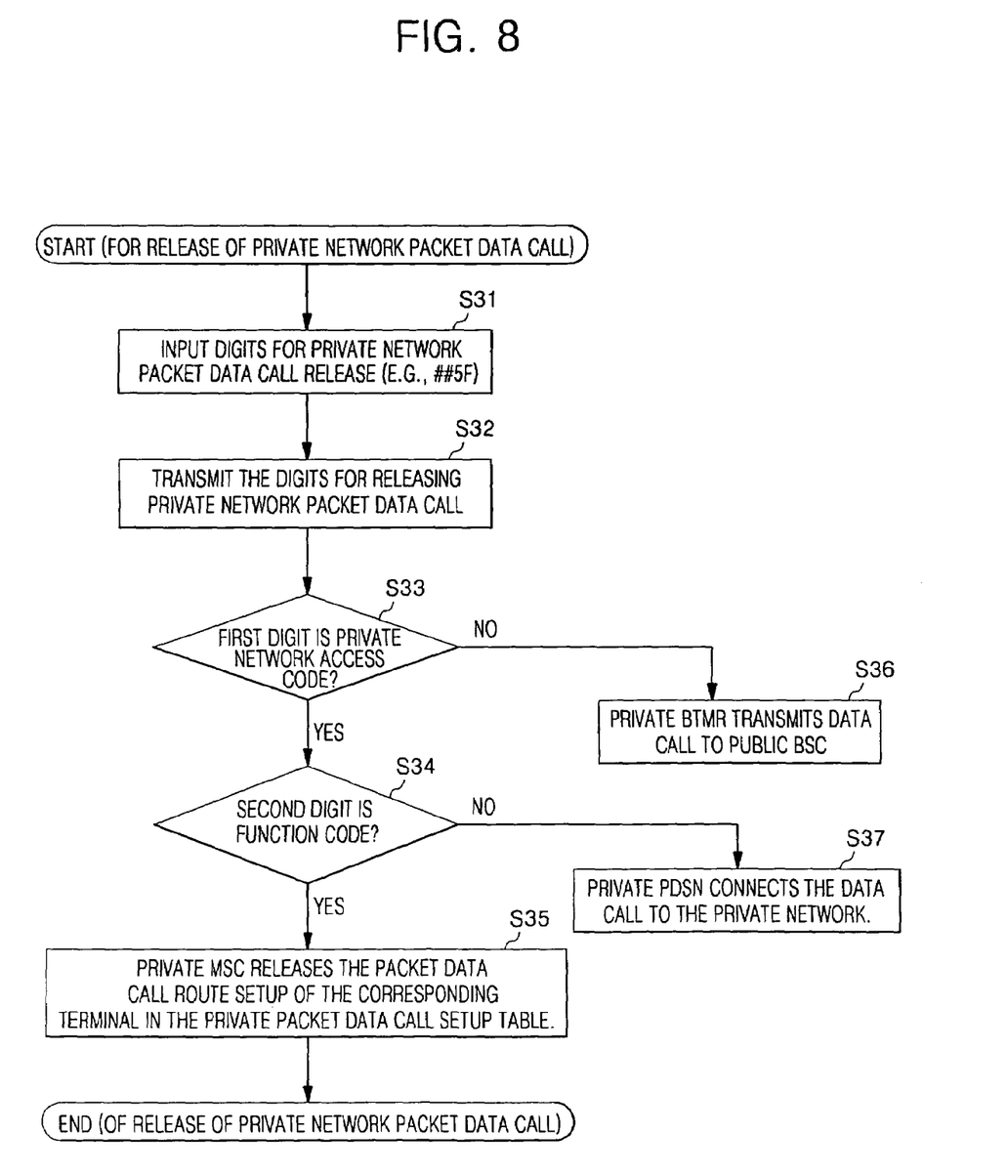
FIG. 8 is a flow diagram illustrating a process of releasing a private network data service function according to an embodiment of the present invention.

FIG. 8 is a flow diagram illustrating a process of releasing a private network data service function according to an embodiment of the present invention.

The process will be discussed with reference to FIG. 8. At this time, it is assumed that a characteristic code for releasing a private network packet data call is "5f".

First, the user inputs digits "##5f" using button keys on the terminal and transmits the digital by pressing a call button (S31, S32).

The meaning of the "##5f" is shown in the following table 2.

TABLE 2

| # | Private network access code |
| # | Function access code |
| 5f | Characteristic code (for releasing a private network packet data call setup) |

The call transmitting side message for setting up a function is transmitted to the private BTMR module 21 where it is determined based on the first digit of the digits whether a requested service is a private network service (S33).

If the first digit is one of general numbers, it means that the code is not a private network access code but a public network access code. Accordingly, the private BTMR module 21 transmits the current data call to the public network BSC (S36).

Although in the present invention, the private BTMR module 21 performing the data call transmission function has been described by way of example, the private BSC module 22, the private PDSN module 23, and the private MSC module 24 may perform it.

Meanwhile, if it is determined in step S33 that the first digit is "#," it means that the code is a private network access code and in turn it is determined whether the second digit is a function code (S34).

If it is determined in step S34 that the second digit is not "#" but one of the general digits, it means a case where there on no separate function setup while connecting to the private network, hence, the private PDSN module 23 connects the data call to the private network (S37).

If it is determined in step S34 that the second digit is "#," it is a case where the user attempts to set up a separate function. Accordingly, in order to release the private packet data call setup depending on the digits "5f" subsequent to the second digit, the private MSC module 24 changes the packet data call route field of the corresponding terminal in the private packet data call setup table 25 into the public network (S35).

Although in the present invention, the private MSC module 24 setting up the packet data call route in the private packet data call setup table 25 has been described by way of example, the private BTMR module 21, the private BSC module 22, and the private PDSN module 23 may set up the route.

Data service request signals transmitted from the terminal after the setup for the private network packet data service is released will pass through the public network unless the setup for the private network packet data call is again made.

Meanwhile, although a case where the private network packet data call is set up has been described in FIG. 8, it may be released when the user desires the release without separately performing private network packet data call setup release process for convenience of a user.

A method of automatically releasing the call includes to setup a timer to allow the call to automatically be released if a certain time elapses after a private network packet data call is setup, or to setting up the number of times to receive the data service in which if the setup number of time is exhausted, the call can be released automatically.

Meanwhile, although not suggested in the present invention, it is possible to combine and use a function of setting a private packet data call timer and a function of setting the number of times of providing a data service. Further, it is possible to add option items to the private packet data call setup table, if additional functions as necessary exist in addition to those functions.

When the specification of the terminal is changed, the terminal is fabricated so as to display various information, such as the network through which the packet data service is transmitted, remaining number of times of transmission, remaining time and so forth, on a (liquid crystal) display. Thereby, the user is allowed to know through which of the networks the terminal transmits the packet data service by the various information related to the data service transmission.

Further, under the situation where the private network is set up for transmission, the user can know how many and how far the packet data service can be transmitted through the private network. As a result, it is possible to maximize the convenience of the user.

The present invention has suggested the method in which a private network or a public network data service can be provided after the network is set up for the data service, and the method in which a usage network is set up at the same time that the data service call is requested by forwarding together an identifier indicating a network to pass through upon requesting the data service call.

It will be appreciated that, although the method in which a network to be used is set up at the same time that the data service call is requested by forwarding the identifier indicating through which network the data is forwarded upon requesting the data service call has been illustrated by way of the manner in which the route determining unit recognizes the identifier and forwards a corresponding data call through the network indicated by the identifier, several other variations are possible.

As described above, according to the present invention, a packet data service can be forwarded through any one selected from the public network and the private network within the interworking wireless public and the wired/wireless private networks, thereby providing convenience for the user.

Further, there is an advantage that a packet data service can be forwarded through the private network by upgrading software in the system without changing hardware and software in each user terminal, and thus separate cost is not caused.

The present invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

Although the exemplary embodiments of the present invention have been described in detail, it will be appreciated by those skilled in the art that several variations or modifications may be made to the present invention without departing from the technical spirit and scope of the present invention defined in the appended claims. Thus, future variations of the embodiments of the present invention will be unable to deviate from the technique of the present invention.

What is claimed is:

1. A method of requesting a data service in interworking wireless public and private networks, comprising:
   setting up, by a user, information as to which of the public and private networks is to receive the data service;
   storing the information set up by the user in a private network database;

when any user requests the data service, retrieving an identifier of a corresponding user terminal from said private network database, and providing the data service through a corresponding one of said private network and said public network depending on a status set up in the database; and releasing a function for setting up the data service through the private network;

wherein setting up said identifier by the user, is performed by the user inputting and setting up digits using button keys of a wireless terminal of the user;

wherein the digits include a combination of a private network access code, a function access code, and a characteristic code which is a private network data service setup function code.

2. The method of claim 1, further comprising:

inputting and setting up a characteristic code, the characteristic code being combined with a private network data service setup function code and a code indicating whether to perform an authentication process on a data call.

3. The method of claim 2, wherein information on the code indicating whether to perform the authentication process, the code being inputted and set up by the user using the button keys of the wireless terminal, is stored in an authentication field of a private network packet data call setup table in a private network control station database.

4. The method of claim 1, further comprising:

inputting and setting a characteristic code, the characteristic code being combined with a private network data service setup function code and a code indicating whether to perform a billing computation.

5. The method of claim 4, wherein the information on the code indicating whether to perform the billing computation, the code being inputted and set by the user using said button key of said wireless terminal, is stored in a billing field of a private network packet data call setup table in a private network control station database.

6. A method of requesting a data service in interworking wireless public and private networks, comprising:

setting up, by a user, information as to which of the public and private networks is to receive the data service;

storing the information set up by the user in a private network database;

when any user requests the data service, retrieving an identifier of a corresponding user terminal from said private network database, and providing the data service through a corresponding one of said private network and said public network depending on a status set up in the database; and releasing a function for setting up the data service through the private network;

wherein releasing the function for setting up the data service through said private network is performed by the user inputting and setting up a specific number using button keys of said wireless terminal, said specific number being a private network access code plus a function access code plus a characteristic code, wherein said characteristic code is a private network data service setup and release function code.

7. A system for providing a data service in interworking wireless public and private networks, comprising:

at least one base station for receiving a data service request signal received from a wireless terminal of a user and transmitting data to be transmitted to said wireless terminal of the user;

a public network taking charge of data control upon transmitting and receiving through the public network the data service request signal transmitted and received through said base station;

a private network having a route determining unit for determining, based on an identifier of the call transmitting side terminal included in the data service request signal received at said base station, through which of said private and public networks to send data for the data service, and transmitting the data through a corresponding network; and a private network dedicated private content server for directly providing the data service through said private network rather than said public network, when said private network determines that the currently received data service request signal is for a private network data service;

wherein the private network includes:

a database having a table structure composed of an identifier field of a call transmitting side terminal and a field indicating a data service route;

a route determining unit for determining the data service route with respect to the identifier by referring to a database that stores the identifier of the call transmitting side terminal transmitting the data service request signal received through the base station, and transmitting the data to a corresponding one of said private network and said public network; and a private network control module for transmitting data for a private network data service to a private content server when the data received through a data routing software module is said private network data service and, when there is an input regarding a setup to use which of said private and public networks from the call transmitting side terminal, writing the input to the database;

wherein the data service route field of said database includes an initial setup being default, said initial setup being set for a public network when the data service route is not voluntarily set by the user.

8. A system for providing a data service in interworking wireless public and private networks, comprising:

at least one base station for receiving a data service request signal received from a wireless terminal of a user and transmitting data to be transmitted to said wireless terminal of the user;

a public network taking charge of data control upon transmitting and receiving through the public network the data service request signal transmitted and received through said base station;

a private network having a route determining unit for determining, based on an identifier of the call transmitting side terminal included in the data service request signal received at said base station, through which of said private and public networks to send data for the data service, and transmitting the data through a corresponding network; and a private network dedicated private content server for directly providing the data service through said private network rather than said public network, when said private network determines that the currently received data service request signal is for a private network data service;

wherein the private network includes:

a database having a table structure composed of an identifier field of a call transmitting side terminal and a field indicating a data service route;

a route determining unit for determining the data service route with respect to the identifier by referring to a database that stores the identifier of the call transmitting side terminal transmitting the data service request signal received through the base station, and transmitting the data to a corresponding one of said private network and said public network; and a private network control module for transmitting data for a private network data service to a private content server when the data received through a data routing software module is said private network data service and, when there is an input regarding a setup to use which of said private and public networks from the call transmitting side terminal, writing the input to the database;

wherein the private network control module includes:

a private network control module for managing a plurality of base stations and taking charge of a wireless channel setup and a frequency hopping process; and a private packet data serving node module for taking charge of a switching function on a data call for a data service.

9. A system for providing a data service in interworking wireless public and private networks, comprising:

at least one base station for receiving a data service request signal received from a wireless terminal of a user and transmitting data to be transmitted to said wireless terminal of the user;

a public network taking charge of data control upon transmitting and receiving through the public network the data service request signal transmitted and received through said base station;

a private network having a route determining unit for determining, based on an identifier of the call transmitting side terminal included in the data service request signal received at said base station, through which of said private and public networks to send data for the data service, and transmitting the data through a corresponding network; and a private network dedicated private content server for directly providing the data service through said private network rather than said public network, when said private network determines that the currently received data service request signal is for a private network data service;

wherein the private network includes:

a database having a table structure composed of an identifier field of a call transmitting side terminal and a field indicating a data service route;

a route determining unit for determining the data service route with respect to the identifier by referring to a database that stores the identifier of the call transmitting side terminal transmitting the data service request signal received through the base station, and transmitting the data to a corresponding one of said private network and said public network; and a private network control module for transmitting data for a private network data service to a private content server when the data received through a data routing software module is said private network data service and, when there is an input regarding a setup to use which of said private and public networks from the call transmitting side terminal, writing the input to the database;

wherein said terminal displays the network through which the packet data service is transmitted, remaining number of times of transmission and remaining time through a liquid crystal display.

10. A method comprising:

inputting a plurality of digits for setting up a private network data call;

transmitting a call transmitting side message with the inputted plurality of digits for setting up a function, to a first unit, where it is determined based on first digits of the plurality of digits of the call transmitting side message whether the message indicates a private network service, the first digits being a private network access code;

when said first digits is one of general numbers, determining that the first digits are not a private network access code but a public network access code and transmitting by the first unit, a data call to a public network base station controller;

when determining that the first digits are the private network access code, determining whether second digits of the plurality of digits of the call transmitting side message are a function code;

when it is determined that the second digits are not the function code but rather general numbers, setting no separate function setup while connecting to the private network, and the private packet data serving node module connecting the data call to the private network; and when determining that the second digits are the function code, setting up a separate function, by establishing a private packet data service route according to the remaining digits of the plurality of digits subsequent to the second digits, a second unit sets a data service call route field of a corresponding terminal in the private data service call setup table as a private network, writes an authentication field to be a certain value and writes a billing field to be a certain second value, which are data service options.

11. A method comprising:

when a terminal of a user in a cell area shared by public and private networks transmits a signal to attempt to connect to a local content server through a uniform resource locator input menu on its browser, invoking a first unit in a private base station controller, data transmission and reception route setup information of a corresponding terminal from a private packet data call setup table;

when a private network packet data route field corresponding to the corresponding call transmitting side terminal identification is set as the private network, executing by said first unit, a private second unit point to point protocol daemon to make point to point protocol negotiation with a point to point protocol client module of the terminal;

when the point-to-point protocol negotiation is completed, comparing a value of the authentication field corresponding to the identification of the corresponding call transmitting side terminal in the private packet data call setup table;

when the value of the authentication field is a certain value, performing the terminal authentication process and then terminating the point-to-point protocol negotiation; and when the point-to-point protocol negotiation process is terminated, a session is established between the terminal and the private content server and terminal of the user is allowed to connect to the local content server, and download packet data desired by the user among contents.

12. A method comprising:
- manually inputting by a user a plurality of values for private network packet data call release including a first set for a private network access code, a second set for a function access code and a third set for a characteristic code for releasing a private network packet data call setup;
- manually transmitting by the user the plurality of values for call transmitting side message, the call transmitting side message for setting up a function being transmitted to a first unit;
- determining at the first unit, based on the first set of the message, whether a requested service is a private network service;
- when the first set are general numbers, determining that code is not a private network access code but rather a public network access code and transmitting the current data call to the public network base station controller by said first unit;
- when it is determined that the first set is a certain first value, the code is determined to be a private network access code and determining whether the second set of values is a function code;
- when it is determined that the second set of values is not the function code, determining that there is no separate function setup while connecting to the private network, and the private second unit connecting the data call to the private network; and
- when it is determined that the second set of values is the function code, determining that the user is setting up a separate function and to release the private packet data call setup depending on the remaining values subsequent to the second certain value, and changing the packet data call route field of the corresponding terminal in the private packet data call setup table into the public network.

* * * * *